United States Patent
Kim et al.

(10) Patent No.: US 9,392,396 B2
(45) Date of Patent: Jul. 12, 2016

(54) METHOD AND DEVICE FOR TRIGGERING MACHINE-TYPE COMMUNICATION MTC IN WIRELESS COMMUNICATION SYSTEM

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 14/357,991

(22) PCT Filed: Nov. 13, 2012

(86) PCT No.: PCT/KR2012/009545
§ 371 (c)(1),
(2) Date: May 13, 2014

(87) PCT Pub. No.: WO2013/070051
PCT Pub. Date: May 16, 2013

(65) Prior Publication Data
US 2014/0307632 A1 Oct. 16, 2014

Related U.S. Application Data

(60) Provisional application No. 61/559,121, filed on Nov. 13, 2011, provisional application No. 61/565,426, filed on Nov. 30, 2011, provisional application No. 61/570,779, filed on Dec. 14, 2011, provisional application No. 61/587,670, filed on Jan. 18, 2012, provisional application No. 61/593,336, filed on Feb. 1, 2012, provisional application No. 61/678,635, filed on Aug. 2, 2012.

(51) Int. Cl.
H04W 4/00 (2009.01)
H04L 1/18 (2006.01)

(52) U.S. Cl.
CPC . *H04W 4/005* (2013.01); *H04L 1/18* (2013.01)

(58) Field of Classification Search
CPC . H04W 4/005; H04W 28/0215; H04W 36/24; H04W 64/04; H04L 1/18
USPC .......................................................... 370/328
See application file for complete search history.

(56) References Cited

U.S. PATENT DOCUMENTS 9,113,355 B2 * 8/2015 Liao
2013/0115983 A1 * 5/2013 Ronneke et al. .............. 455/466
2015/0319640 A1 * 11/2015 Liao ...................... H04W 4/005
370/230

FOREIGN PATENT DOCUMENTS

KR 10-2011-0122643 11/2011

OTHER PUBLICATIONS

3rdGeneration Partnership Project (3GPP), "Technical Specification Group Services and System Aspects; System Improvements for Machine-Type Communications (Release 11)," 3GPP TR 23.888 V1.5.0, Oct. 2011, 155 pages.
Nokia Siemens Networks, et al., "Direct Delivery using T5a/T5b procedure," SA WG2 Temporary Document, SA WG2 Meeting #88, S2-115165, Nov. 2011, 3 pages.
PCT International Application No. PCT/KR2012/009545, Written Opinion of the International Searching Authority dated Mar. 29, 2013, 20 pages.

* cited by examiner

*Primary Examiner* — Kwang B Yao
*Assistant Examiner* — Syed M Bokhari
(74) *Attorney, Agent, or Firm* — Lee, Hong, Degerman, Kang & Walmey; Jonathan Kang; Michael Monaco

(57) ABSTRACT

The present invention relates to a method for enabling a MTC (machine type communication) IWF (interworking function) to perform a trigger request in a wireless communication system. The method includes transferring, to a first serving node, the trigger request and information related to retrying the trigger request which includes information on whether to retry if the transferring of the trigger request fails, wherein if the information on whether to retry indicates retrying, the retrying of the trigger request is assigned to the first serving node.

8 Claims, 8 Drawing Sheets

METHOD AND DEVICE FOR TRIGGERING MACHINE-TYPE COMMUNICATION MTC IN WIRELESS COMMUNICATION SYSTEM

CROSS-REFERENCE TO RELATED APPLICATIONS

This application is the National Stage filing under 35 U.S.C. 371 of International Application No. PCT/KR2012/009545, filed on Nov. 13, 2012, which claims the benefit of U.S. Provisional Application Ser. No. 61/559,121, filed on Nov. 13, 2011, 61/565,426, filed on Nov. 30, 2011, 61/570,779, filed on Dec. 14, 2011, 61/587,670, filed on Jan. 18, 2012, 61/593,336, filed on Feb. 1, 2012, and 61/678,635, filed on Aug. 2, 2012, the contents of which are all hereby incorporated by reference herein in their entirety.

TECHNICAL FIELD

The present invention relates to a wireless communication system, and more particularly, to a method of performing or supporting an MTC (machine type communications) triggering and an apparatus therefor.

BACKGROUND ART

A machine type communication means a communication scheme including one or more machines and is also called an M2M (machine-to-machine) communication or an object communication. In this case, a machine means an entity which is not requiring a direct handling or involvement of a human. For instance, an example of the machine may include a smartphone capable of performing a communication by automatically accessing a network without a handling/involvement of a user as well as a device such as a meter or a vending machine equipped with a mobile communication module. Various examples of the machine are called an MTC device or simply a device in this disclosure. In particular, the MTC indicates a communication performed by one or more machines without a handling/involvement of a human.

The MTC may include a communication (e.g., D2D (device-to-device) communication) between MTC devices and a communication between an MTC device and an MTC application server. As an example of the communication between the MTC device and the MTC application server, a communication between a vending machine and a server, a communication between a POS (point of sale) device and a server and a communication between an electric, gas or water meter and a server. Besides, an application based on the MTC may include a security application, a transportation application, a healthcare application, and the like.

DISCLOSURE OF THE INVENTION

Technical Task

A technical task of the present invention is to provide a method of precisely and efficiently performing a triggering for an MTC device.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of performing a MTC (machine type communication) trigger request, which is performed by a MTC-IWF (interworking function) in a wireless communication system includes the step of transmitting the trigger request and information on a retry of the trigger request to a first serving node, wherein the information on the retry of the trigger request includes information on whether to perform the retry when transmission of the trigger request fails and wherein if the information on whether to perform the retry indicates to perform the retry, the retry of the trigger request is delegated to the first serving node.

To further achieve these and other advantages and in accordance with the purpose of the present invention, according to a second technical aspect of the present invention, an MTC-IWF (interworking function) device performing an MTC (machine type communication) trigger request in a wireless communication system includes a transceiving module and a processor, the processor configured to transmit the trigger request and information on a retry of the trigger request to a first serving node, wherein the information on the retry of the trigger request includes information on whether to perform the retry when transmission of the trigger request fails and wherein if the information on whether to perform the retry indicates to perform the retry, the retry of the trigger request is delegated to the first serving node.

The first to the second technical aspect of the present invention can include items in the following.

The information on the retry of the trigger request can be determined in consideration of at least one selected from the group consisting of the number of available serving node, a congestion status of a network, preference of an MTC user equipment and whether roaming of the MTC user equipment is performed.

The delegation of the retry of the trigger request may mean to indicate the first serving node to deliver the trigger request to a second serving node when the delivery of the trigger request fails. In this case, if the first serving node fails to deliver the trigger request to a user equipment and if the information on whether to perform the retry indicates to perform the retry, the first serving node delivers the trigger request to the second serving node and the second serving node transmits the trigger request to the user equipment. And, the information on the retry of the trigger request may further include at least one of the number of retry and validity time of the retry. The number of available serving node capable of transmitting the trigger request may correspond to at least 2. The first serving node and the second serving node respectively correspond to one of a SGSN (serving GPRS (general packet radio service) supporting node), an MME (mobility management entity), and an MSC (mobile switching center).

If the first serving node fails to deliver the trigger request to a user equipment and if the information on whether to perform the retry indicates not to perform the retry, the MTC-IWF may receive a delivery report message indicating a failure of delivering the trigger request from the first serving node. In this case, the method can further include the steps of transmitting a subscriber notification message, which is transmitted to a HSS (home subscriber server)/a HLR (home location register) by the MCT-IWF to subscribe a user equipment-related information notification service and receiving a notification subscriber information message indicating that trigger delivery to the user equipment becomes available from the HSS/HLR, wherein the notification subscriber information message may include information on at least one serving node capable of transmitting a trigger to the user equipment. The method may further include the step of determining a second serving node among the at least one serving node using the notification subscriber information message and transmitting trigger request and information on a retry of the trigger request to the second serving node. And, the information on the at least one serving node may include an identifier of the at least one serving node.

The method may further include the steps of receiving the trigger request from an SCS (service capability server) and verifying whether the trigger request is valid.

It is to be understood that both the foregoing general description and the following detailed description are exemplary and explanatory and are intended to provide further explanation of the invention as claimed.

Advantageous Effects

According to the present invention, a method of precisely and efficiently performing a triggering for an MTC device can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Figure 1:
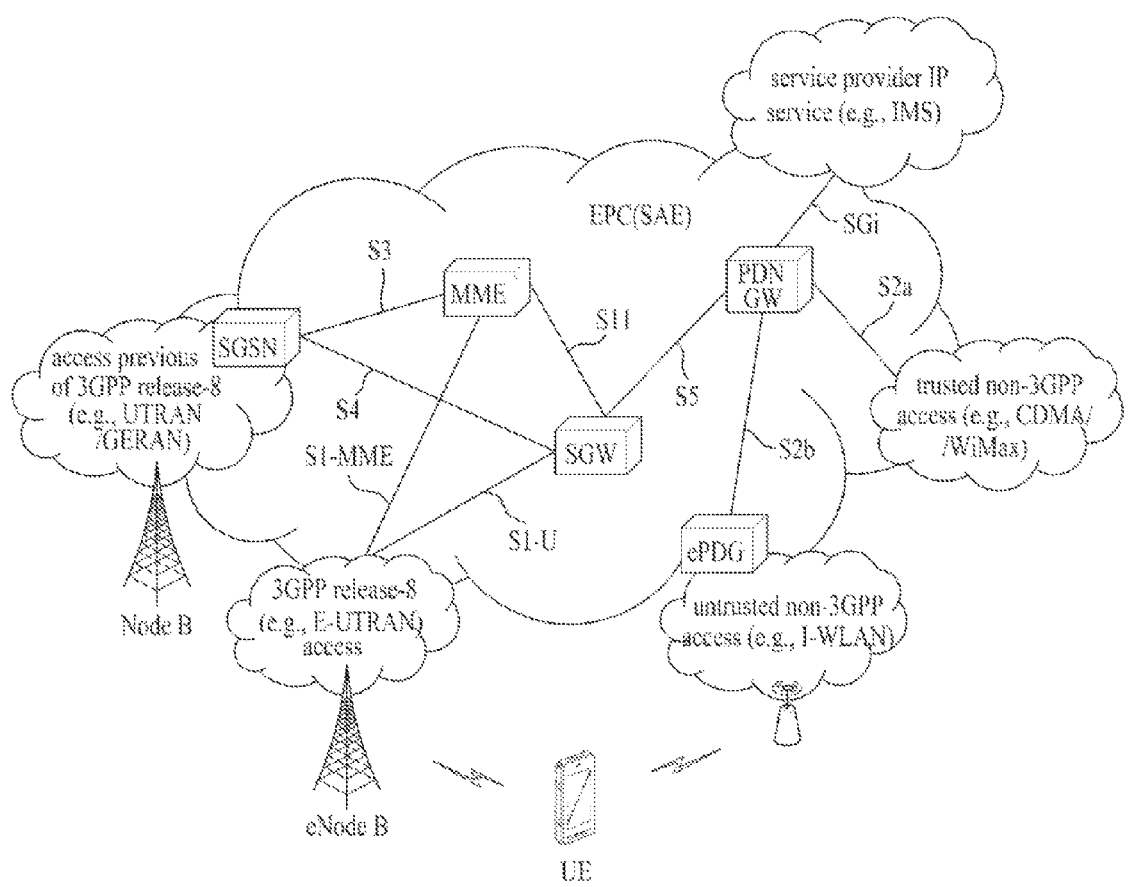
FIG. 1 is a diagram for a schematic structure of an EPC (evolved packet core)

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE (institute of electrical and electronics engineers) 802 system, 3GPP system, 3GPP LTE system, 3GPP LTE-A system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless communication systems. For clarity, the following description mainly concerns 3GPP LTE and LTE-A system, by which the technical idea of the present invention may be non-limited.

Terminologies usable in this disclosure can be defined as follows.

UMTS (universal mobile telecommunications system): a GSM (global system for mobile communication)-based $3^{rd}$ generation mobile communication technology developed by 3GPP.

EPS (evolved packet system): a network system consisting of an IP-based packet switched core network, i.e., EPC (evolved packet core) and an access network such as LTE, UTRAN and the like. The EPS is an evolved version of UMTS.

Node B: a base station of an UMTS network installed outdoors. Coverage of the Node B corresponds to a macro cell size.

eNode B: a base station of an EPS network installed outdoors. Coverage of the eNode B corresponds to a macro cell size.

User equipment: user device. The user equipment may be named a terminal, an ME (mobile equipment), an MS (mobile station) and the like. The user equipment may correspond to such a device capable of being carried as a notebook, a cellular phone, a PDA (personal digital assistant), a smartphone, a multimedia device and the like. Or, the user equipment may correspond to such a device incapable of being carried as a PC (personal computer) and a device mounted on a vehicle. In content related to MTC, the user equipment or such a terminology as user equipment may indicate MTC user equipment.

IMS (IP multimedia subsystem): a subsystem providing multimedia service based on IP.

IMSI (international mobile subscriber identity): an internationally unique user identifier allocated in a mobile communication network.

MTC (machine type communications): a communication performed by a machine without involvement of a human.

MTC user equipment (MTC UE (or MTC device)): a user equipment equipped with a communication function via a mobile communication network and performing a specific purpose (e.g., vending machine, a meter and the like).

MTC server: a server managing an MTC UE in a network. The MTC server may exist inside or outside of a mobile communication network and may have an interface accessible by an MTC user. The MTC server may provide an MTC-related service to different servers (SCS form) or the MTC server itself may correspond to an MTC application server.

MTC application: a service to which an MTC is applied (e.g., remote metering, tracing movement of supply and the like)

MTC application server: a server in which an MTC application is executed in a network.

MTC feature: a network function to support an MTC application. For instance, MTC monitoring is a feature for preparing for losing a device in an MTC application such as remote metering and the like. Low mobility is a feature for supporting an MTC application for an MTC UE such as a vending machine.

MTC subscriber: an entity having an access relationship with a network operator and providing a service to at least one MTC UE.

MTC group: a group of MTC UEs that shares at least one MTC feature and belongs to an MTC subscriber.

SCS (services capability server): an entity performing MTC-IWF (MTC interworking function) and communicating with an MTC UE in a HPLMN. The SCS accesses a 3GPP network.

External identifier: a globally unique identifier used for an external entity (e.g., SCS or application server) of a 3GPP network to indicate (or identify) an MTC UE (or a subscriber to which the MTC UE belongs). The external identifier is classified into a domain identifier and a local identifier as follows.

Domain identifier: an identifier used for identifying a domain controlled by a service provider of a mobile communication network. In order for one service provider to provide access to services different from each other, the service provider may use a different domain identifier according to a service.

Local identifier: an identifier used for inferring or obtaining IMSI (international mobile subscriber identity). The local identifier should be unique in an application domain. The local identifier is managed by a service provider of a mobile communication network.

RAN (radio access network): a unit including a Node B, an eNode B and an RNC (radio network controller) controlling the Node B and the eNode B in a 3GPP network. The RAN exists between UEs and provides a connection to a core network.

HLR (home location register)/HSS (home subscriber server): a database including subscriber information in a 3GPP network. The HSS may perform such a function as configuration storage, identity management, user state storage and the like.

RANAP (RAN application part): an interface between nodes (MME (mobility management entity)/SGSN (serving GPRS (general packet radio service) supporting node)/MSC (mobile switching center)) in charge of controlling a RAN and a core network.

PLMN (public land mobile network): a network configured to provide a service to individuals. The PLMN can be configured according to an operator.

NAS (non-access stratum): a functional layer configured to transceive a signaling and a traffic message between a UE and a core network in UMTS protocol stack. A main function of the NAS is to support mobility of the UE and a session management procedure for establishing and maintaining an IP connection between the UE and a PDN GW.

Following description is explained based on the above-mentioned terminologies.

FIG. 1 is a diagram for a schematic structure of an EPC (evolved packet core).

The EPC is an essential element of SAE (system architecture evolution) to enhance performance of 3GPP technologies. The SAE corresponds to a research subject determining a network structure supporting mobility between various types of networks. For instance, an object of the SAE is to provide an optimized packet-based system supporting various wireless access technologies based on an IP and providing more enhanced data transmission capability and the like.

Specifically, the EPC is a core network of an IP mobile communication system for a 3GPP LTE system supporting a packet-based real time and non-real time service. In a legacy mobile communication system (i.e., $2^{nd}$ generation or $3^{rd}$ generation mobile communication system), a function of the core network is implemented via 2 subdomains divided into a CS (circuit-switched) for audio and a PS (packet-switched) for data. Yet, in a 3GPP LTE system corresponding to an evolved version of the $3^{rd}$ generation mobile communication system, the subdomains of the CS and the PS are unified into a single IP domain. In particular, in the 3GPP LTE system, a connection between user equipments equipped with an IP capability can be configured via an IP-based base station (e.g., eNode B (evolved Node B)), an EPC, and an application domain (e.g., IMS). In particular, the EPC is an essential structure to implement an end-to-end IP service.

The EPC may include various configuration elements. A part of the various configuration elements including a SGW (serving gateway), a PDN GW (packet data network gateway), an MME (mobility management entity), an SGSN 9 serving GPRS (general packet radio service) supporting node), and an ePDG (enhanced packet data gateway) are depicted in FIG. 1.

The SGW operates as a boundary point between a RAN (radio access network) and a core network. The SGW is an element performing a function of maintaining a data path between an eNode B and the PDN GW. And, if a UE moves in a manner of passing through a region served by the eNode B, the SGW plays a role of a local mobility anchor point. In particular, packets can be routed via the SGW for mobility in E-UTRAN (evolved-UMTS (universal mobile telecommunications system) defined after 3GPP release-8). And, the SGW may function as an anchor point for mobility with a different 3GPP network (a RAN defined before 3GPP release-8, e.g., UTRAN or GERAN (GSM (global system for mobile communication)/EDGE (enhanced data rates for global evolution) radio access network).

The PDN GW corresponds to a termination point of a data interface heading to a packet data network. The PDN GW can support policy enforcement features, packet filtering, charging support and the like. And, the PDN GW may play a role of an anchor point for mobility management between a 3GPP network and a non-3GPP network (e.g., such an untrusted network as I-WLAN (interworking wireless local area network) and such a trusted network as a CDMA (code division multiple access) network and a Wimax).

Although an example of a network structure depicted in FIG. 1 shows that the SGW and the PDN GW are separately configured, two gateways can be implemented according to a single gateway configuration option.

The MME is an element performing signaling and control functions configured to support an access of a UE for a network connection, allocation of a network resource, tracking, paging, roaming, handover and the like. The MME controls control plane functions related to a subscriber and session management. The MME manages many eNode Bs and performs signaling for selecting a legacy gateway to make a handover to a different 2G/3G network. And, the MME performs functions such as security procedures, terminal-to-network session handling, idle terminal location management and the like.

The SGSN handles all packet data such as mobility management of a user for a different 3GPP network (e.g., GPRS network) and authentication.

The ePDG plays a role of a security node for an untrusted non-3GPP network (e.g., I-WLAN, WiFi hotspot, etc.).

As mentioned earlier with reference to FIG. 1, a UE equipped with IP capability can access an IP service network (e.g., IMS) provided by a service provide (i.e., operator) via various elements in the EPC not only based on a 3GPP access but also based on a non-3GPP access.

And, FIG. 1 shows various reference points (e.g., S1-U, S1-MME and the like). In 3GPP system, a conceptual link connecting 2 functions existing in E-UTRAN and functional entities different from each other in the EPC is defined as a reference point. Following Table 1 is a summary of the reference points depicted in FIG. 1. Besides examples shown in FIG. 1, various reference points may exist according to a structure of a network.

TABLE 1

| Reference point | description |
| --- | --- |
| S1-MME | Reference point for the control plane protocol between E-UTRAN and MME |
| S1-U | Reference point between E-UTRAN and serving GW for the per bearer user plane tunneling and inter eNode B path switching during handover |
| S3 | It enables user and bearer information exchange for inter 3GPP access network mobility in idle and/or active state. This reference point can be used intra-PLMN or inter-PLMN (e.g. in the case of inter-PLMN HO)). |
| S4 | It provides related control and mobility support between GPRS core and the 3GPP anchor function of serving GW. In addition, if direct tunnel is not established, it provides the user plane tunneling. |
| S5 | It provides user plane tunneling and tunnel management between serving GW and PDN GW. It is used for serving GW relocation due to UE mobility and if the serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points depicted in FIG. 1, the S2a and the S2b correspond to the non-3GPP interface. The S2a is a reference point providing related control between a trusted non-3GPP access and the PDN GW and mobility support to a user plane. The S2b is a reference point providing related control between the ePDG and the PDN GW and mobility support to the user plane.

Figure 2:
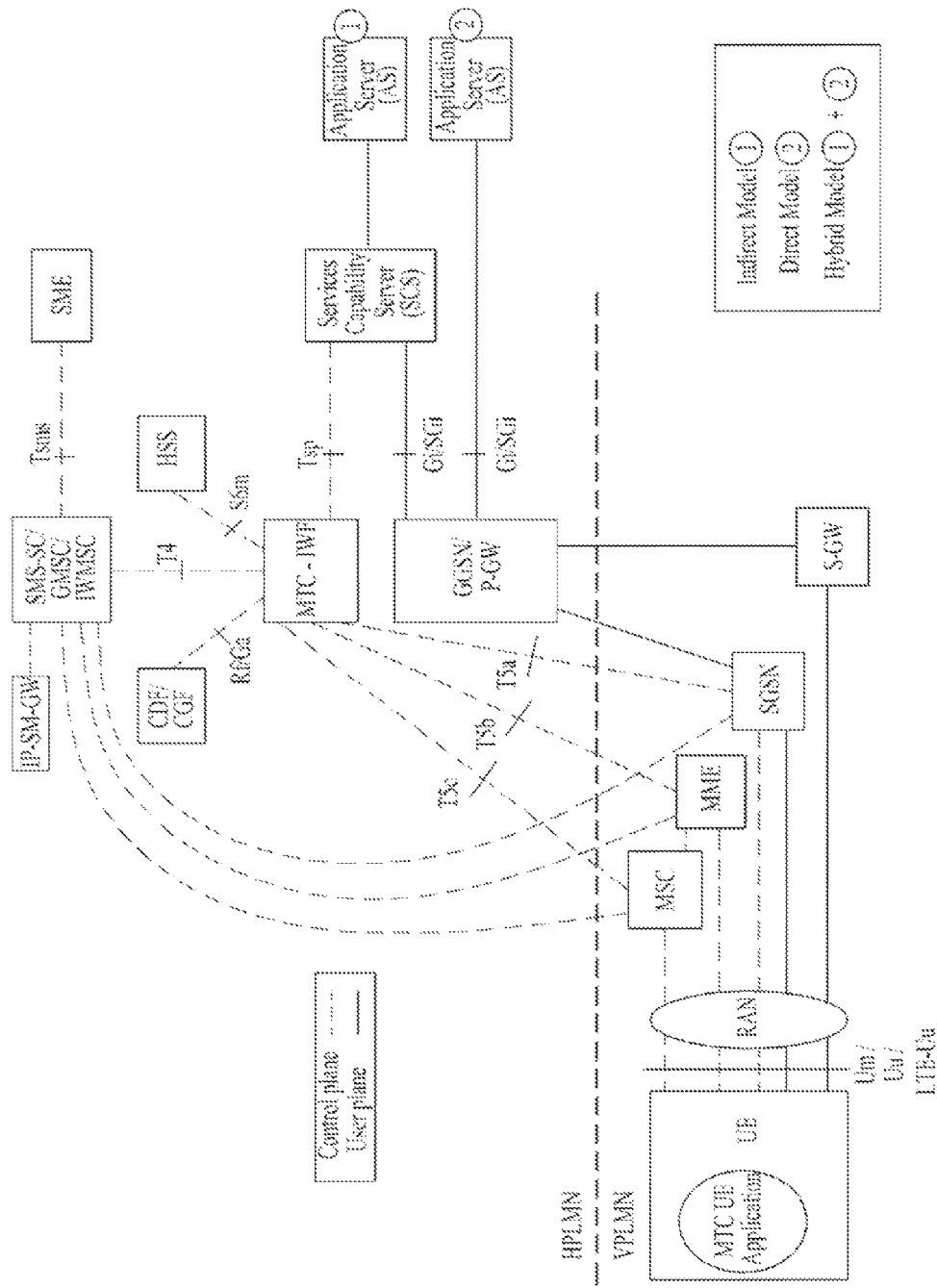
FIG. 2 is a diagram for an example of a model of an MTC structure.

FIG. 2 is a diagram for an example of a model of an MTC structure.

An end-to-end application between a UE (or MTC UE) used for an MTC and an MTC application can use services provided by a 3GPP system and selective services provided by an MTC server. The 3GPP system can provide transportation and communication services (including 3GPP bearer service, IMS and SMS) including various optimizations for enabling the MTC to be smoothly performed. FIG. 2 shows that the UE used for the MTC is connected to a 3GPP network (UTRAN, e-UTRAN, GERAN, I-WLAN, and the like) via Um/Uu/LTE-Uu interface. An architecture depicted in FIG. 2 includes various models (direct model, indirect model and hybrid model).

First of all, entities shown in FIG. 2 are explained.

In FIG. 2, an application server corresponds to a server in which an MTC application is executed in a network. The aforementioned various technologies to implement the MTC application can be applied to the MTC server. Detailed explanation on the technologies is omitted at this time. And, in FIG. 2, the MTC application server can access an MTC server via a reference point API. Detailed explanation on this is omitted. Or, the MTC application server may co-locate with the MTC server.

The MTC server (e.g., SCS server depicted in FIG. 2) is a server managing the MTC UE in the network. The MTC server can communicate with the UE used for the MTC and nodes of PLMN in a manner of being connected with the 3GPP network.

An MTC-IWF (MTC-interworking function) controls interworking between the MTC server and an operator core network and may play a role of a proxy of an MTC operation. In order to support an MTC indirect or hybrid model, at least one MTC-IWF may exist in a home PLMN (HPLMN). The MTC-IWF can make a specific function of the PLMN work in a manner of relaying or interpreting a signaling protocol on a reference point Tsp. The MTC-IWF can perform a function of authenticating the MTC server, a function of authenticating a control plane request requested by the MTC server, various functions related to a trigger indication, which is described later, and the like before the MTC server establishes a communication with the 3GPP network.

An SMS-SC (short message service-service center)/IP-SM-GW (internet protocol short message gateway) can manage transmission and reception of an SMS (short message service). The SMS-SC may be in charge of relaying a short message between an SME (short message entity) (an entity transmitting or receiving a short message) and a mobile station and performing a function of storing-and-delivering the short message. The IP-SM-GW may be in charge of a protocol interworking between an IP-based UE and the SMS-SC.

A CDF (charging data function)/CGF (charging gateway function) may perform an operation related to charging.

An HLR/HSS may perform a function of storing subscriber information (IMSI and the like), routing information, configuration information and the like and a function of providing the informations to the MTC-IWF.

An MSC/SGSN/MME can perform such a control function as mobility management for network connection of a UE, authentication, resource allocation, and the like. In relation to a triggering described later, the MSC/SGSN/MME receives a trigger indication from the MTC-IWF and can perform a function of processing the trigger indication into a form of a message provided to the MTC UE.

A GGSN (gateway GPRS support node)/S-GW (serving gateway)+P-GW (packet data network-gateway) can perform a function of a gateway taking charge of establishing a connection between a core network and an external network.

Following Table 2 is a summary of the main reference points depicted in FIG. 2.

TABLE 2

| Reference point | Description |
| --- | --- |
| Tsms | It is the reference point an entity outside the 3GPP system used to communicate with UEs used for MTC via SMS. |
| Tsp | It is the reference point an entity outside the 3GPP system uses to communicate with the MTC-IWF related control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWH and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

Among the aforementioned T5a, T5b, and T5c, at least one reference point is called a T5.

Meanwhile, a user plane communication with the MTC server in case of the indirect and the hybrid model and a communication with the MTC application server in case of the direct and the hybrid model can be performed using a legacy protocol via a reference point Gi and SGi.

Detailed items related to the content described in FIG. 2 can be incorporated in the present specification by referring to 3GPP TS 23.682 document.

In case of performing an MTC, it is expected that a plurality of MTC UEs greater than a general user device in number exist in a network. Hence, in order to perform the MTC, it is required to use a minimum network resource, a minimum signaling, a minimum power, and the like.

And, in order for an MTC UE to minimally use a system resource, the MTC UE may not establish an IP connection with an MTC application server in an ordinary time. If the MTC application server fails to transmit data to the MTC UE since the MTC UE does not establish the IP connection, the MTC application server can request or indicate the MTC UE to establish the IP connection. This is called a trigger indication. In particular, MTC UE triggering is requested when an IP address of the MTC UE is not available by the MTC application server or is not reachable to the MTC application server (when an entity or an address of the entity is not reachable, it means that a try to deliver a message fails due to such a reason as an absence of the entity in the address and the like). To this end, the MTC UE can receive the trigger indication from a network. Having received the trigger indication, the MTC UE performs an operation of an MTC application within the MTC UE or the MTC UE is requested to establish a communication with the MTV application server. In this case, when the MTC UE receives the trigger indication, it may assume following 3 cases, a) the MTC UE is offline (the MTC UE is not attached to the network), b) the MTC UE is online (the MTC UE is attached to the network) but data connection is not established, or c) the MTC UE is online (the MTC UE is attached to the network) and the data connection is established.

For instance, when an IP connection (or PDN connection) capable of receiving data from the MTC application server is not established (or when the MTC UE can receive a basic control signal but cannot receive user data), the triggering for the MTC UE may correspond that the MTC UE performs an operation of the MTC application within the MTC UE using a triggering message and/or an operation making the MTC UE request an IP connection request to the MTC application server. And, the triggering message can be represented as a message including information (hereinafter called triggering information) for enabling a network to route the message to a suitable MTC UE and the information for enabling the MTC UE to route the message to a suitable application within the MTC UE.

Figure 3:
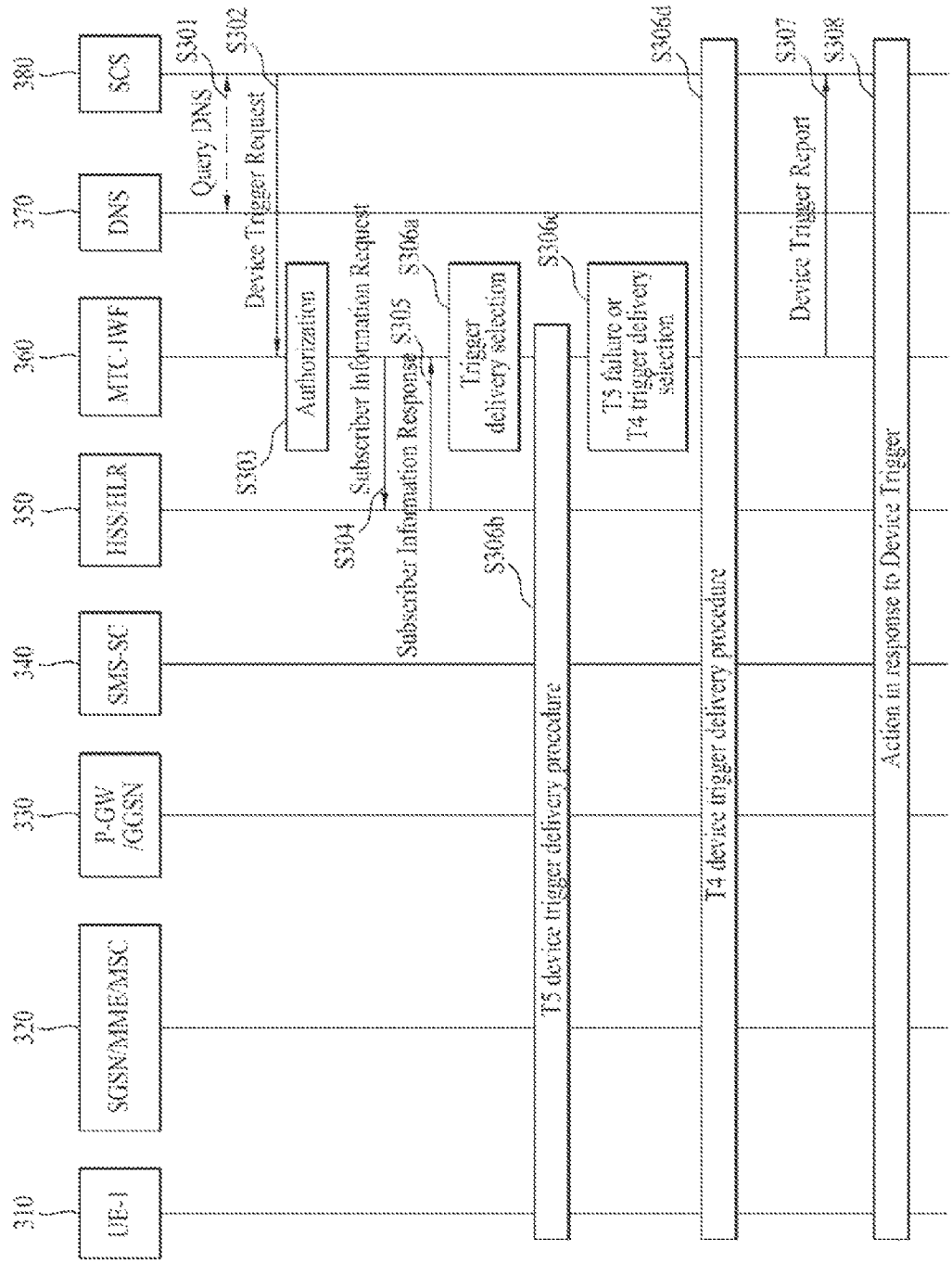
FIG. 3 is a diagram for explaining a trigger delivery procedure of an MTV device.

More specific MTC triggering procedures are explained with reference to FIG. 3.

The SCS 380 can determine to trigger the MTC UE [S301]. If there is no information on the MTC-IWF contacted by the SCS to make a request for triggering, an IP address or a port number of the MTC-IWF can be determined by performing a DNS query to a DNS 370 using an external identifier of the MTC UE to be triggered or an identifier of the MTC-IWF configured within the SCS. Subsequently, the SCS 380 transmits a device trigger request message to the MTC-IWF 360 [S302]. The device trigger request message can include information listed in a following Table 3.

TABLE 3 i) external identifier or MSISDN: an identifier of an MTC UE (or a subscriber to which the MTC UE belongs) to be triggered
ii) SCS identifier: an identifier of the SCS transmitting the device trigger request message
iii) trigger reference number: a reference number of the transmitted device trigger request message
iv) validity period: a time period for which the device trigger request is valid. If a trigger is not delivered to the MTC UE, a network entity (e.g., MTC-IWF) informs a period of storing the device trigger request
v) priority: priority of delivering the device trigger request
vi) trigger payload: information delivered to MTC application within the MTC UE Having received the device trigger request message from the SCS 380, the MTC-IWF 360 performs authorization verification for whether a trigger request transmitted to a 3GPP network by the SCS is permitted [S303]. If the authorization verification fails, the MTC-IWF 360 transmits a device trigger confirmation message indicating that the device trigger request has failed to the SCS 380. On the contrary, if the authorization verification successes, a next step can be performed.

The MTC-IWF 360 transmits a subscriber information request message to HSS/HLR 350 [S304]. The subscriber information request message is transmitted to check whether the SCS is permitted to trigger the MTC UE, to obtain IMSI using the identifier of the MTC UE received in the step S302, and to obtain routing information including an identifier of a serving node that serves the MTC UE.

The HSS/HLR 350 checks whether the SCS, which has transmitted the device trigger request message, corresponds to the SCS permitted to trigger the MTC UE [S305]. Subsequently, the HSS/HLR 350 transmits a subscriber information response message to the MTC-IWF 360. The subscriber information response message includes an identifier of the IMSI and an identifier of the serving node that serves the MTC UE. As a result of the checking, if the SCS is not permitted to trigger the MTC UE or if there is no valid subscription information related to the MTC UE in the HSS/HLR 350, the HSS/HLR 350 transmits a subscriber information response message including information on the aforementioned content to the MTC-IWF 360. In this case, the MTC-IWF 360 transmits a device trigger confirmation message indicating that the device trigger request has failed to the SCS 380 and does not perform following steps.

The MTC-IWF 360 selects a trigger delivery procedure based on the information received from the HSS/HLR 350 and a local policy [S306a].

If a delivery procedure using a T5 is selected, the MTC-IWF 360 performs a T5 trigger delivery procedure [S306b]. Detailed explanation on the T5 trigger delivery procedure is described later with reference to FIG. 4. If a delivery procedure using a T4 is selected in the step S306a or if the T5 delivery fails in the step S306b, the MTC-IWF 360 performs a T4 trigger delivery procedure [S306c to S306d]. Detailed explanation on the T4 trigger delivery procedure is described later with reference to FIG. 5.

The MTC-IWF 360 transmits a device trigger report message to the SCS 380 in response to the device trigger request message in the step S302 [S307]. The device trigger report message indicates whether a trigger delivery to the MTC UE is successful in response to the device trigger requested by the SCS.

As a response to the received device trigger, a UE-1 performs an operation based on content of a trigger payload. The operation typically includes initiation of a communication with the SCS or an AS (application server).

Figure 4:
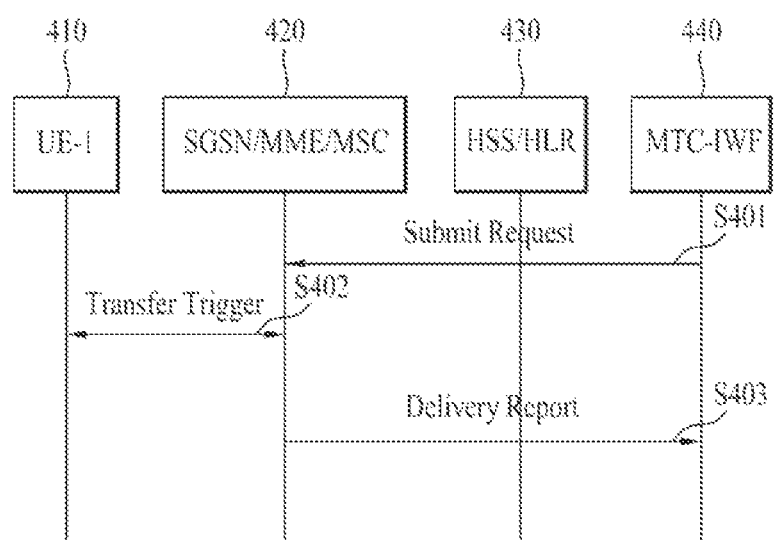
FIG. 4 is a diagram for explaining a trigger delivery procedure using a T5.

FIG. 4 is a diagram for explaining a T5 trigger delivery procedure. If the MTC-IWF receives a device trigger request from the SCS in the step S302 of FIG. 3, the MTC-IWF selects an appropriate trigger delivery procedure based on information received from the HSS/HLR and a local policy [S304 to S306a in FIG. 3]. As a result, the MTC-IWF can transmit a device trigger request to the SGSN via a T5a interface, can transmit the device trigger request to the MME via a T5b interface, can transmit the device trigger request to the MSC via a T5c interface (the device trigger via T5a, the T5b, and the T5c can be called a T5 device trigger), or can transmit the device trigger request to the SMS-SC via a T4 interface. For instance, referring to FIG. 4, if there are a plurality of available serving nodes based on information obtained from the HSS/HLR, the MTC-IWF 440 selects an appropriate serving node. The MTC-IWF 440 transmits a submit request message to the selected serving node [S401]. As mentioned in the foregoing description, if the selected serving node corresponds to the SGSN, the MTC-IWF 440 transmits the submit request message via the T5a interface, If the selected serving node corresponds to the MME, the MTC-IWF 440 transmits the submit request message via the T5b interface, or if the selected serving node corresponds to the MSC, the MTC-IWF 440 transmits the submit request message via the T5c interface.

Having received the submit request message, the serving node 420 delivers a trigger message to the UE-1 410 corresponding to a target UE of the device trigger [S402]. Having performed the trigger operation, the serving node 420 transmits a delivery report message to the MTC-IWF 460. The delivery report message indicates whether the trigger delivery to the MTC UE is successful in response to the device trigger requested by the MTC-IWF.

Figure 5:
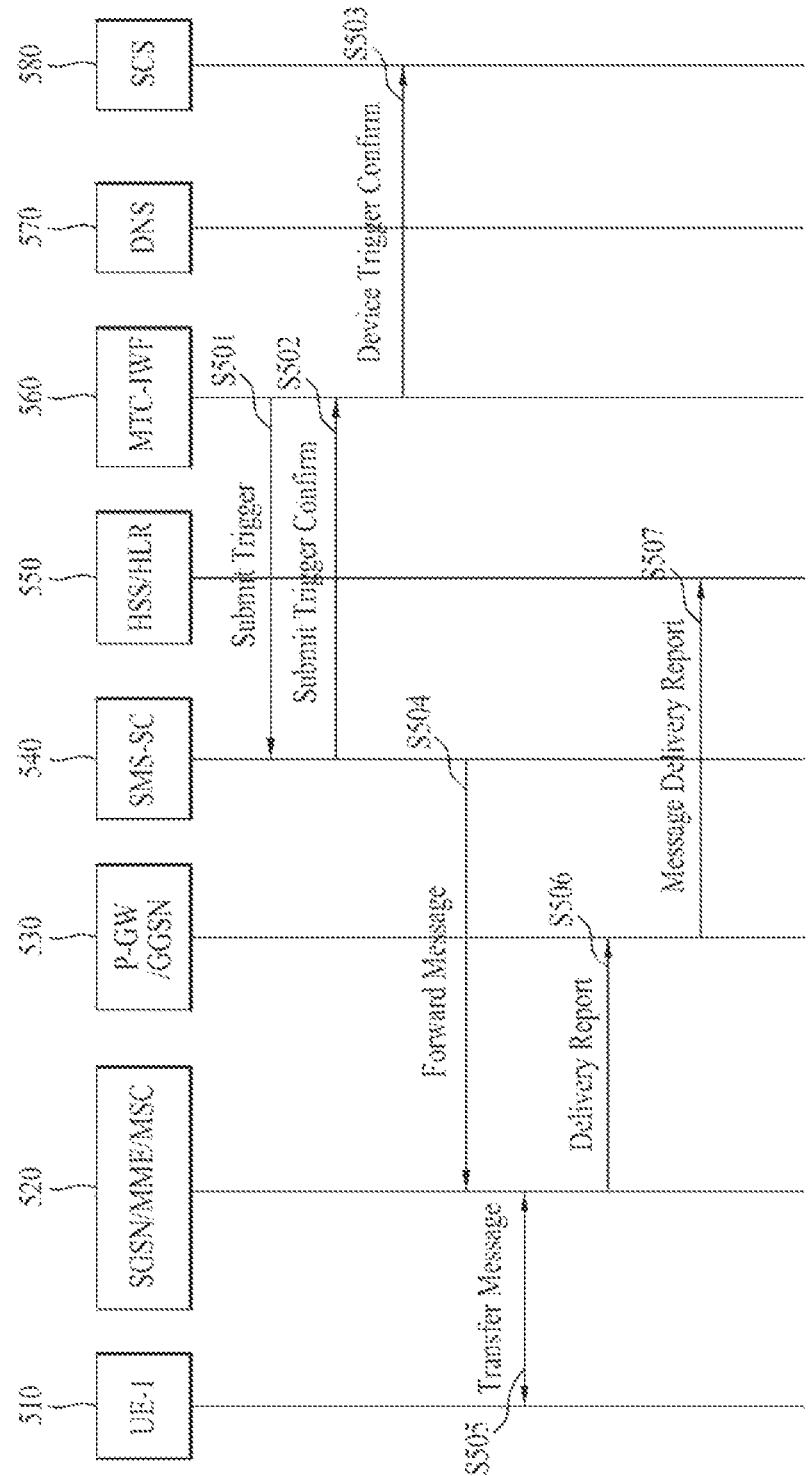
FIG. 5 is a diagram for explaining a trigger delivery procedure using a T4.

FIG. 5 is a diagram for explaining a T4 trigger delivery procedure. Referring to FIG. 5, the MTC-IWF 560 transmits a submit trigger message to the SMS-SC 540 based on information included in the device trigger request message received from the SCS 580 and information included in the subscriber information response message received from the HSS/HLR 550 [S501]. The SMS-SC 540 transmits a submit trigger confirmation message indicating that the SMS-SC has accepted the submit trigger message to the MTC-IWF 560 [S502]. Having received the submit trigger confirmation message from the SMS-SC 540, the MTC-IWF 560 transmits a device trigger confirmation message indicating that the MTC-IWF has accepted the device trigger request message transmitted by the SCS to the SCS 580 [S503].

A short message including the device trigger message transmitted by the SMS-SC 540 is delivered to the serving node 520 [S504]. In this case, if the received device trigger message includes routing information (information on the serving node), the SMS-SC 540 does not need to perform interrogation with the HSS/HLR 550 to obtain the routing information. The SMS-SC 540 stores necessary information among the information received from the MTC-IWF 560 except the routing information in preparation for a case that a short message transmission fails.

Subsequently, the serving node 520 delivers the short message to the UE-1 510 [S505]. Having received the short message including the device trigger message, the UE-1 510 may respond to the serving node 520. The serving node 520 transmits a delivery report message to the SMS-SC 540 [S506]. The delivery report message may indicate whether the delivery of the short message delivered to the MTC UE is successful in response to the delivery of the short message requested by the SMS-SC. If the delivery of the short message fails, the SMS-SC 540 obtains routing information in a manner of performing the interrogation with the HSS/HLR 550 to deliver the short message to the UE-1 510 and may be then able to perform re-transmission using the information stored in the step S504. The SMS-SC 540 transmits a message delivery report to the MTC-IWF 560 to indicate whether the trigger delivery to the MTC UE is successful in response to the device trigger requested by the MTC IWF [S507].

In the aforementioned MTC trigger procedure, if the device trigger request operation fails, the MTC-IWF can perform a trigger retry. Specifically, if the T5 trigger delivery fails, the MTC-IWF can retry the device trigger via the T4 trigger. And, when the T4 trigger procedure is used, if the transmission of the short message including the trigger message fails, the SMS-SC can perform re-transmission. Moreover, if the device trigger operation fails, the serving nodes (SGSN, MME and MSC), which have received the device trigger request from the MTC-IWF via the T5 interface, can perform a retry as well.

In particular, a retry operation to trigger an identical MTC UE can occur in a plurality of network nodes. It implies possibility of inefficiently and unclearly managing a device triggering.

Hence, in order to solve the aforementioned problem, an efficient method of triggering the MTC UE is explained in the following. When the MTC-IWF transmits a trigger request to the serving node (SGSN, MME, and MSC) or the SMS-SC, the present invention proposes a method of transmitting information on a retry of the trigger request together with the trigger request. In particular, the information on the retry of the trigger request includes information on whether to perform the retry in case that the trigger request fails to be delivered. If the information indicates to perform the retry, the trigger request retry can be delegated to a next node.

In this case, the delegation of the trigger request retry means to instruct the next node to deliver the trigger request when the trigger request fails to be delivered. And, the next node may correspond to the serving node in case that the MTC-IWF transmits the trigger request to the serving node (SGSN, MME, and MSC) and the next node may corresponds to the SMS-SC in case that the MTC-IWF transmits the trigger request to the SMS-SC.

And, the aforementioned 'retry' means to perform at least one of the following by the node, which has received the device trigger request from the MTC-IWF, after failing a trigger operation to the UE. i) The node stores the transmission-failed device trigger request (in the node or in a third node) and performs the trigger operation to the UE again by the node, ii) the node stores information (or information on a trigger in progress or information on a trigger on standby) indicating that there exist a trigger to be delivered to the UE due to the failure of the trigger operation, iii) the node transmits the transmission-failed device trigger request to a different node in a network to make the different node or a third node store the transmission-failed device trigger request, iv) if the node recognizes that trigger delivery to the UE becomes available (in particular, if the node recognizes that the UE to be triggered becomes available (reachable) or if the node is able to perform a device trigger delivery operation, for instance, the node was not able to perform the device trigger delivery operation due to the congestion of the node but the node is now able to perform the device trigger delivery operation since the congestion status of the node is lifted), the node can inform the availability of the trigger delivery to the UE of the different node of the network. In other word, the node may enable the different node or the third node to perform the trigger retry.

Prior to explanation, a triggering method according to the present invention is applicable to such various cases as an SMS-based device trigger request used by the MTC-IWF, a NAS-based device trigger request used by the MTC-IWF, a user plane-based device trigger request used by the MTC-IWF, and the like. And, the MTC UE may attach to at least one of a PS domain, a CS domain and an IMS domain and the MTC UE may access at least one of GERAN, UTRAN, E-UTRAN, WLAN and 3GPP2. And, the present invention can be applied to both an online device triggering and an offline device triggering. The MTC-IWF may co-locate with the SCS or the application server or the MTC-IWF may correspond to a separate node. Or, the MTC-IWF may co-locate with a legacy different network node. A role of the MTC-IWF node described in the following may be performed by a different node (e.g., the SCS or the application server).

Information on Retry of Trigger Request

Specifically, information on a retry of a trigger request can include informations described in the following. In this case, the trigger request can be transmitted to the serving node by the MTC-IWF via the T5 interface or can be transmitted to the SMS-SC by the MTC-IWF via the T4 interface. In both cases, the informations described in the following can be included in the information on the retry of the trigger request.

First of all, the information on the retry of the trigger request may include information (or information indicating that only one try will be performed) indicating that the retry will not be performed. The information indicating that the retry will not be performed can be explicitly or implicitly included. And, it is able to indicate not to perform the retry in a manner of not including the aforementioned information. And, a plurality of informations may complexly indicate not to perform the retry.

Secondly, the information on the retry of the trigger request may include information (or information indicating to perform a plurality of retries or information informing a next node of delegation of the retry) indicating to perform the retry. The information indicating to perform the retry can be explicitly or implicitly included. And, it is able to indicate not to perform the retry in a manner of not including the aforementioned information. And, a plurality of informations may complexly indicate not to perform the retry.

Thirdly, the information on the retry of the trigger request may include the number of retry (or the number of try). The MTC-IWF does not include the information (or information indicating to perform a plurality of tries) indicating to perform the retry. Instead, the MTC-IWF may transmit a device trigger request to a next node in a manner of including the number of retry configured by a number greater than 0 or the number of try configured by a number greater than 1 only. This sort of the number of retry (or the number of try) implies a meaning indicating to perform the retry. And, the MTC-IWF does not include the information (or the information indicating that only one try will be performed) indicating that the retry will not be performed. Instead, the MTC-IWF may transmit the device trigger request to the next node in a manner of including the number of retry configured by 0 or the number of try configured by 1 only. This sort of the number of retry (or the number of try) implies a meaning indicating not to perform the retry.

Fourthly, the information on the retry of the trigger request may include validity time of retry (or validity time of try). The validity time of retry can be represented by various forms. For the details of the validity time of retry, it may refer to validity period-related content of 3GPP TS 23.040. And, the information can accompany a validity period format parameter. And, a value of the validity time of retry may be based on a value of validity time (or validity period) received from the SCS by the MTC-IWF. In this case, the validity time of retry can be configured by a value identical to the value of validity time received from the SCS. Or, the validity time of retry can be configured by a value less than the value of validity time received from the SCS. If the SCS does not include the validity time in the device trigger request, the MTC-IWF can configure the validity time of retry based on a configured value (a value based on an operator policy, a value obtained from the SCS in advance, or the like) and/or a network status (e.g., congestion) and the like.

The MTC-IWF does not include the information (or the information indicating that only one try will be performed) indicating that the retry will not be performed. Instead, the MTC-IWF may transmit the device trigger request to the next node in a manner of including the validity time of retry (or validity time of try) configured by 0. The validity time of retry (or validity time of try) configured by 0 indicates not to perform the retry. And, the MTC-IWF does not include the information (or information indicating to perform a plurality of tries) indicating to perform the retry. Instead, the MTC-IWF may transmit the device trigger request to the next node in a manner of including the validity time of retry (or validity time of try) configured by a number, which is not 0.

When the MTC-IWF transmits an SMS-based trigger request to the SMS-SC via the T4 interface, the MTC-IWF may use a field included in an SMS message, a newly defined field, or a field newly defined in a new message (a message in which the SMS message is encapsulated) defined for the device trigger request. If the SMS-SC defers a device trigger operation due to such a reason as network congestion and the like (i.e., in case of deferring the device trigger operation until the network congestion is resolved), the validity time of retry can be applied to the aforementioned case although it is not a retry. In particular, in this case, if it becomes available to perform the device trigger operation before the validity time of retry expires, the SMS-SC performs the device trigger operation. Yet, if it is still impossible to perform the device trigger operation until the validity time of retry expires, the SMS-SC informs the MTC-IWF of failure of the device trigger. In this case, the MTC-IWF may receive a trigger request from the MTC server.

When the MTC-IWF transmits a trigger request to the serving node via the T5 interface, information on a retry of the trigger request may further include informations described in the following.

First of all, it is able to include information indicating to perform the retry by transmitting the device trigger request to a counterpart node (i.e., MME in case of SGSN, SGSN in case of MME) via an S3 interface between the SGSN and the MME. The information may indicate or include address information of the counterpart node.

Secondly, it is able to include information indicating to perform the retry by transmitting the device trigger request to a counterpart node (i.e., MSC in case of SGSN, SGSN in case of MSC) via an interface between the SGSN and the MSC. The information may indicate or include address information of the counterpart node.

Thirdly, it is able to include information indicating to perform the retry by transmitting the device trigger request to a counterpart node (i.e., MSC in case of MME, MME in case of MSC) via an interface between the MME and the MSC. The aforementioned informations, i.e., the information indicating to perform the retry with a different serving node, can be explicitly or implicitly included. And, it is able to indicate to perform the retry with the different serving node in a manner of not including the aforementioned information. And, a plurality of informations may complexly indicate that the retry is performed with the different serving node.

Meanwhile, when the information on the retry includes both the number of retry and retry valid time information and the information on the retry indicates that a node stores the transmission-failed device trigger request (in the node or in a third node) and performs the trigger operation to the UE again by the node, if at least one of the number of retry and the retry valid time exceeds, the node, which has received the device trigger request from the MTC-IWF, does not perform the trigger operation to the UE anymore. Moreover, the node may delete the stored device trigger request as well.

And, when the information on the retry includes both the number of retry and retry valid time information and the information on the retry indicates that the node stores information (or information on a trigger in progress or information on a trigger on standby) indicating that there exist a trigger to be delivered to the UE due to the failure of the trigger operation, if a value of the retry valid time exceeds, the node, which has received the device trigger request from the MTC-IWF, deletes the stored information indicating that there exist a trigger to be delivered to the UE. Moreover, if the transmission-failed trigger request is configured to be stored by a different node or a third node by transmitting the transmission-failed device trigger request to the different node, the node may transmit a message for indicating that the stored request will be deleted.

In order to include the aforementioned informations on the retry, it is able to use a legacy field included in a legacy message (a NAS message, an SMS message, a NAS message in which the SMS message is encapsulated, and the like), a field newly defined in the legacy message, or a newly defined field in a new message defined for the device trigger request. If the MSC, the SGSN, or the MME defers a device trigger operation due to such a reason as network congestion and the like (i.e., in case of deferring the device trigger operation until the network congestion is resolved), the validity time of retry can be applied to the aforementioned case although it is not a retry. In particular, in this case, if it becomes available to perform the device trigger operation before the validity time of retry expires, the MSC, the SGSN, or the MME performs the device trigger operation. Yet, if it is still impossible to perform the device trigger operation until the validity time of retry expires, the MSC, the SGSN, or the MME informs the MTC-IWF of failure of the device trigger.

In determining whether the aforementioned information on the retry is included, it may consider exemplary items depicted in Table 4 as follows.

TABLE 4 i) a next node to which a device trigger request is transmitted and/or interface availability
ii) the number of available serving node
iii) operator policy
iv) network congestion status, congestion status of each interface (Tsp, T4, T5a, T5b, T5c)
v) congestion status of MTC-IWF, congestion status of next node(s)
vi) information included in a device trigger request message received from SCS (e.g., validity time, priority, and the like)
vii) information on a device trigger obtained in advance from SCS, MTC user, or MTC subscriber (e.g., preference and the like)
viii) history information on a previous device trigger try (e.g., success rate for a device trigger request to each next node, the number of retry)
ix) a response for a device trigger request received from a next node and information included in the response (e.g., a reason of failure, the number of failure, and the like)
x) whether MTC UE performs roaming or not
xi) capability information of MTC UE and/or characteristic of the MTC UE The items becoming a base of the determination may be non-limited by the aforementioned examples. Any information can be used if it is necessary for determining whether the information on the retry is included.

And, the informations on the aforementioned retry can be applied to a case of performing the retry as well as a case of initially performing a trigger request.

As mentioned in the foregoing description, when the MTC-IWF transmits the trigger request together with the information on the retry, if the device trigger operation fails, a device trigger retry can be applied. In the following, the device trigger retry is explained. The retry can be performed by a node identical to the node which has transmitted a previous trigger request or a different node. If the retry is performed by the node different from the previous node, it can be named a fallback mode.

First Example of Operation when Trigger Transmission Fails

When the MTC-IWF transmits a device trigger request to the SGSN, the MME or the MSC via T5a, T5b or T5c interface, if transmission of the device trigger request fails and the MTC-IWF indicates a next node to perform a retry, the next node can make a different node or a third node store a transmission-failed device trigger request in a manner of transmitting the transmission-failed device trigger request to the different node of a network. Or, if the MTC-IWF recognizes that trigger delivery to a UE becomes available, the MTC-IWF can perform an operation (this operation enables the different node or the third node to perform the trigger retry) for informing the different node of the network of the availability of the trigger delivery. A trigger storing request made to the different node or the third node can be transmitted to the SMS-SC, the MTC-IWF, or the HSS/HLR. Operations of each case are explained in the following.

First of all, the transmission-failed device trigger request can be stored in the SMS-SC (or a third storing node managed by the SMS-SC). A serving node (i.e., SGSN/MME/MSC), which has failed to transmit the device trigger, transmits a transmission-failed device trigger request message to the SMS-SC to make the SMS-SC store the transmission-failed device trigger request. In this case, additional information (e.g., an address of the serving node, the number of transmission try of the serving node, whether the device trigger request message corresponds to a SMS form, and the like) can be transmitted to the SMS-SC together with the device trigger request message. The SMS-SC can transmit a response in response to the device trigger storing request message received from the serving node. If there exists a direct interface between the serving node and the SMS-SC, exchange of the message between the serving node and the SMS-SC can be directly performed in a form of 'serving node-to-SMS-SC'. Or, the exchange of the message can be performed in a form of 'serving node-to-MTC-IWF-to-SMS-SC' via a T5a, a T5b, a T5c and a T4 interface or in a form of 'serving node-to-SMS-GMSC (or SMS-IWMSC)-to SMS-SC'. In addition to the aforementioned cases, it may perform a step performed by the serving node, the SMS-SC, or a middle node to make a request for configuration of information indicating that there exists a trigger to be delivered to a UE due to a failure of a trigger operation to the HSS/HLR.

Regarding the device trigger requested to be stored, the SMS-SC knows that the trigger delivery to the UE becomes available via at least one of the following. i) the serving node transmits a message indicating that the trigger delivery to the UE becomes available to the SMS-SC (message exchange between the serving node and the SMS-SC), ii) the HSS/HLR, which has known the availability of the trigger delivery to the UE, transmits a message to the SMS-SC to inform the availability (message exchange between the HSS/HLR, the SMS-IWMSC, and the SMC-SC or message exchange between the HSS/HLR and the SMS-SC). To this end, the SMS-SC can subscribe a UE-related information notification service provided by the HSS/HLR, iii) the MTC-IWH, which has known the availability of the trigger delivery to the UE, transmits a message to the SMS-SC to inform the availability (message exchange between the MTC-IWF and the SMS-SC).

The SMS-SC, which has known the availability of the trigger delivery to the UE, can transmit the device trigger request message stored in the node of the SMS-SC or a third node to the UE via at least one of the following. i) The SMS-SC directly transmits the device trigger request message to the serving node. Having received the device trigger request message, the serving node delivers the device trigger request message to the UE. In this case, the serving node may correspond to a serving node which has requested to store the device trigger request message or a different serving node. In this case, the serving node to which the device trigger request message is transmitted may correspond to the serving node which has informed the SMS-SC of the availability of the triggered UE. ii) The SMS-SC transmits the device trigger request message of an SMS form to the SMS-GMSC according to an SMS scheme and delivers the device trigger request message to the UE via a path on which the SMS is delivered. iii) The SMS-SC delivers the device trigger request message to the MTC-IWF. Having received the device trigger request message, the MTC-IWF delivers the device trigger request message to the UE via the T5a, the T5b, or the T5c interface.

Secondly, the transmission-failed device trigger request can be stored in the MTC-IWF (or a third storing node managed by the MTC-IWF). A serving node (i.e., SGSN/MME/MSC), which has failed to transmit the device trigger, transmits a transmission-failed device trigger request message to the MTC-IWF to make the MTC-IWF store the transmission-failed device trigger request. In this case, the MTC-IWF can continuously hold the device trigger request message until the MTC-IWF receives a response indicating that transmission is successful from the serving node. In this case, if the serving node transmits a response indicating a failure of transmission for the device trigger request message to the MTC-IWF, it may mean that the MTC-IWF continuously stores the device trigger request message. Message exchange between the serving node and the MTC-IWF is performed via the T5a, the T5b or the T5c interface. In addition to the aforementioned scheme, it may perform a step performed by the serving node or the MTC-IWF to make a request for configuration of information indicating that there exists a trigger to be delivered to a UE due to a failure of a trigger operation to the HSS/HLR.

Regarding the device trigger requested to be stored, the MTC-IWF knows that the trigger delivery to the UE becomes available via at least one of the following. i) the serving node transmits a message indicating that the trigger delivery to the UE becomes available to the MTC-IWF (message exchange between the serving node and the MTC-IWF), ii) the HSS/HLR, which has known the availability of the trigger delivery to the UE, transmits a message to the MTC-IWF to inform the availability. In this case, the HSS/HLR may provide information on the serving node, which is necessary for retrying a trigger delivery, to the MTC-IWF. (message exchange between the HSS/HLR and the MTC-IWF. To this end, the MTC-IWF can subscribe a UE-related information notification service provided by the HSS/HLR).

The MTC-IWF, which has known the availability of the trigger delivery to the UE, can transmit the device trigger request message stored in the node of the MTC-IWF or a third node to the UE via at least one of the following. i) The MTC-IWF transmits the device trigger request message to the serving node using the T5a, T5b, or the T5c interface. Having received the device trigger request message, the serving node delivers the device trigger request message to the UE. (In this case, the serving node may correspond to a serving node which has requested to store the device trigger request message (or the serving node which has informed the transmission failure) or a different serving node. In this case, the serving node to which the device trigger request message is transmitted may correspond to the serving node which has informed the MTC-IWF of the availability of the triggered UE. (this may be efficient when a T4 interface does not exists in an MTC network or when transmission of a legacy SMS scheme is not available since the triggered UE is MSISDN-less UE despite the T4 interface exists) ii) The MTC-IWF transmits the device trigger request message to the SMS-SC via the T4 interface and delivers the device trigger request message to the UE via a path on which an SMS is delivered (when the device trigger request message is transmitted to the SMS-SC, additional information (information on the serving node, which has informed the MTC-IWF of the availability of the UE, and the like) can be delivered together with the device trigger request message).

Thirdly, the transmission-failed device trigger request can be stored in the HSS/HLR (or a third storing node managed by the HSS/HLR). A serving node (i.e., SGSN/MME/MSC), which has failed to transmit the device trigger, transmits a transmission-failed device trigger request message to the HSS/HLR to make the HSS/HLR store the transmission-failed device trigger request. In this case, additional information (e.g., an address of the serving node, the number of transmission try of the serving node, whether the device trigger request message corresponds to a SMS form, and the like) can be transmitted to the HSS/HLR together with the device trigger request message. The HSS/HLR can transmit a response in response to the device trigger storing request message received from the serving node. Exchange of the message between the serving node and the HSS/HLR can be performed in a form of 'serving node-to-HSS/HLR' via a direct interface.

Regarding the device trigger requested to be stored, the HSS/HLR knows that the trigger delivery to the UE becomes available via at least one of the following. i) the serving node transmits a message indicating that the trigger delivery to the UE becomes available to the HSS/HLR (message exchange between the serving node and the HSS/HLR), ii) the MTC-IWF, which has known the availability of the trigger delivery to the UE, transmits a message to the HSS/HLR to inform the availability (message exchange between the MTC-IWF and the HSS/HLR).

The HSS/HLR, which has known the availability of the trigger delivery to the UE, can transmit the device trigger request message stored in the node of the HSS/HLR or a third node to the UE via at least one of the following. i) The HSS/HLR directly transmits the device trigger request message to the serving node. Having received the device trigger request message, the serving node delivers the device trigger request message to the UE. (In this case, the serving node may correspond to a serving node which has requested to store the device trigger request message or a different serving node. In this case, the serving node to which the device trigger request message is transmitted may correspond to the serving node which has informed the HSS/HLR of the availability of the triggered UE). ii) The HSS/HLR delivers the device trigger request message to the MTC-IWF. Having received the device trigger request message, the MTC-IWF delivers the device trigger request message to the UE via the T5a, the T5b, or the T5c interface.

Second Example of Operation when Trigger Transmission Fails

If transmission of a device trigger request fails when the MTC-IWF transmits the device trigger request to the SGSN, the MME or the MSC via T5a, T5b or T5c interface and if the transmission of the device trigger request fails when the MTC-IWF transmits the device trigger request to the SMS-SC via a T4 interface, if the MTC-IWF indicates a next node not to perform a retry, the transmission-failed device trigger request can be stored in the MTV-IWF or can be stored in a different node by asking the different node to store the transmission-failed device trigger request. Additionally, if it is recognized that trigger delivery to a UE becomes available, the MTC-IWF or the node, which has stored the device trigger request message, may perform an operation of performing a trigger retry. A trigger storing request made to the different node or the third node can be transmitted to the SMS-SC, the MTC-IWF, or the HSS/HLR. Operations of each case are explained in the following.

First of all, the transmission-failed device trigger request can be stored in the SMS-SC (or a third storing node managed by the SMS-SC). Having received a transmission failure response message from a serving node (i.e., SGSN/MME/MSC), which has failed to transmit the device trigger, the MTC-IWF transmits the transmission-failed device trigger request message to the SMS-SC to make the SMS-SC store the transmission-failed device trigger request message. In this case, additional information (e.g., an address of the serving node (s) which has failed to transmit, the number of transmission try, whether the device trigger request message corresponds to a SMS form, and the like) can be transmitted to the SMS-SC together with the device trigger request message. The SMS-SC can transmit a response in response to the device trigger storing request message received from the MTC-IWF.

Message exchange between the MTC-IWF and the SMS-SC can be performed in a form of 'MTC-IWF-to-SMS-SC' using a T4 interface. In addition, it may perform a step performed by the MTC-IWF or the SMS-SC to make a request for configuration of information indicating that there exists a trigger to be delivered to a UE due to a failure of a trigger operation to the HSS/HLR.

Regarding the device trigger requested to be stored, the SMS-SC knows that the trigger delivery to the UE becomes available via at least one of the following. i) the serving node transmits a message indicating that the trigger delivery to the UE becomes available to the SMS-SC (message exchange between the serving node and the SMS-SC), ii) the HSS/HLR, which has known the availability of the trigger delivery to the UE, transmits a message to the SMS-SC to inform the availability (message exchange between the HSS/HLR, the SMS-IWMSC, and the SMC-SC or message exchange between the HSS/HLR and the SMS-SC). To this end, the SMS-SC can subscribe a UE-related information notification service provided by the HSS/HLR, iii) the MTC-IWH, which has known the availability of the trigger delivery to the UE, transmits a message to the SMS-SC to inform the availability (message exchange between the MTC-IWF and the SMS-SC).

The SMS-SC, which has known the availability of the trigger delivery to the UE, can transmit the device trigger request message stored in the node of the SMS-SC or a third node to the UE via at least one of the following. i) The SMS-SC directly transmits the device trigger request message to the serving node. Having received the device trigger request message, the serving node delivers the device trigger request message to the UE. (In this case, the serving node to which the device trigger request message is transmitted may correspond to a serving node which has informed the SMS-SC of the availability of the triggered UE). ii) The SMS-SC transmits the device trigger request message of an SMS form to the SMS-GMSC according to an SMS scheme and delivers the device trigger request message to the UE via a path on which the SMS is delivered. iii) The SMS-SC delivers the device trigger request message to the MTC-IWF. Having received the device trigger request message, the MTC-IWF delivers the device trigger request message to the UE via the T5a, the T5b, or the T5c interface (in this case, the SMS-SC may transmit the stored device trigger request message to the MTC-IWF in response to the message transmitted to the SMS-SC by the MTC-IWF to inform the availability of the triggered UE).

Secondly, the transmission-failed device trigger request can be stored in the MTC-IWF (or a third storing node managed by the MTC-IWF). Having received a transmission failure response message from a serving node (i.e., SGSN/MME/MSC), which has failed to transmit the device trigger, the MTC-IWF stores the transmission-failed device trigger request message.

Message exchange between the serving node and the MTC-IWF is performed via the T5a, the T5b or the T5c interface. In addition, it may perform a step performed by the serving node or the MTC-IWF to make a request for configuration of information indicating that there exists a trigger to be delivered to a UE due to a failure of a trigger operation to the HSS/HLR.

Regarding the stored device trigger, the MTC-IWF knows that the trigger delivery to the UE becomes available via at least one of the following. i) the serving node transmits a message indicating that the trigger delivery to the UE becomes available to the MTC-IWF (in particular, the message indicating that the UE to be triggered is available or reachable or the serving node becomes available for performing an operation of delivering the device trigger (e.g., the node was not able to perform the device trigger delivery operation due to the congestion of the node but the node is now able to perform the device trigger delivery operation since the congestion status of the node is lifted) (message exchange between the serving node and the MTC-IWF), ii) the HSS/HLR, which has known the availability of the trigger delivery to the UE, transmits a message to the MTC-IWF to inform the availability. In this case, the HSS/HLR may provide information on the serving node, which is necessary for retrying a trigger delivery, to the MTC-IWF. (message exchange between the HSS/HLR and the MTC-IWF). To this end, the MTC-IWF can subscribe a UE-related information notification service provided by the HSS/HLR (in particular, the message indicating that the UE to be triggered is available or reachable or the serving node becomes available for performing an operation of delivering the device trigger (e.g., the node was not able to perform the device trigger delivery operation due to the congestion of the node but the node is now able to perform the device trigger delivery operation since the congestion status of the node is lifted).

The MTC-IWF, which has known the availability of the trigger delivery to the UE, can transmit the device trigger request message stored in the node of the MTC-IWF or a third node to the UE via at least one of the following. i) The MTC-IWF transmits the device trigger request message to the serving node using the T5a, T5b, or the T5c interface. Having received the device trigger request message, the serving node delivers the device trigger request message to the UE. In this case, the serving node may correspond to a serving node which has informed the transmission failure or a different serving node. In this case, the serving node to which the device trigger request message is transmitted may correspond to the serving node which has informed the MTC-IWF of the availability of the triggered UE. ii) The MTC-IWF transmits the device trigger request message to the SMS-SC via the T4 interface and delivers the device trigger request message to the UE via a path on which an SMS is delivered (when the device trigger request message is transmitted to the SMS-SC, additional information (information on the serving node, which has informed the MTC-IWF of the availability of the UE, and the like) can be delivered together with the device trigger request message).

Thirdly, the transmission-failed device trigger request can be stored in the HSS/HLR (or a third storing node managed by the HSS/HLR). Having received a transmission failure response message from a serving node (i.e., SGSN/MME/MSC), which has failed to transmit the device trigger, the MTC-IWF transmits the transmission-failed device trigger request message to the HSS/HLR to make the HSS/HLR store the transmission-failed device trigger request message. In this case, additional information (e.g., an address of the serving node (s) which has failed to transmit, the number of transmission try, whether the device trigger request message corresponds to a SMS form, and the like) can be transmitted to the HSS/HLR together with the device trigger request message. The HSS/HLR can transmit a response in response to the device trigger storing request message received from the MTC-IWF. Message exchange between the MTC-IWF and the HSS/HLR can be performed in a form of 'MTC-IWF-to-HSS/HLR' via a direct interface.

Regarding the device trigger requested to be stored, the HSS/HLR knows that the trigger delivery to the UE becomes available via at least one of the following. i) the serving node transmits a message indicating that the trigger delivery to the UE becomes available to the HSS/HLR (message exchange between the serving node and the HSS/HLR), ii) the MTC-IWF, which has known the availability of the trigger delivery to the UE, transmits a message to the HSS/HLR to inform the availability (message exchange between the MTC-IWF and the HSS/HLR).

The HSS/HLR, which has known the availability of the trigger delivery to the UE, can transmit the device trigger request message stored in the node of the SMS-SC or a third node to the UE via at least one of the following. i) The HSS/HLR directly transmits the device trigger request message to the serving node. Having received the device trigger request message, the serving node delivers the device trigger request message to the UE. (In this case, the serving node to which the device trigger request message is transmitted may correspond to a serving node which has informed the HSS/HLR of the availability of the triggered UE). ii) The HSS/HLR delivers the device trigger request message to the MTC-IWF. Having received the device trigger request message, the MTC-IWF delivers the device trigger request message to the UE via the T5a, the T5b, or the T5c interface (in this case, the HSS/HLR may transmit the stored device trigger request message to the MTC-IWF in response to the message transmitted to the HSS/HLR by the MTC-IWF to inform the availability of the triggered UE), iii) the HSS/HLR transmits the device trigger request message to the SMS-SC. Having received the device trigger request message, the SMS-SC delivers the device trigger request message to the UE via a path on which an SMS is delivered.

In the foregoing description, when the network nodes such as MME/SGSN/MSC, MTC-IWF, HSS/HLR, and SMS-SC store information indicating that there exist a trigger (or a short message including a trigger message) to be delivered to the UE due to the failure of the trigger, information indicating that there exist a trigger in progress or a trigger on standby, or a transmission-failed device trigger request message, the network nodes can use an identifier for the UE as an index for storing and searching in the future. In this case, the identifier for the UE may correspond to Table 5 in the following.

TABLE 5 i) external identifier (a value of the external identifier itself can be used or a part of the value (local identifier) configuring the external identifier can be used only)
ii) MSISDN
iii) IMSI
iv) trigger reference number (reference number of a trigger configured when the MTC server transmits the device trigger request to the MTV-IWF)
v) ID of the SCS which has transmitted the device trigger request
vi) SCS/application domain name The identifier may be non-limited by the above-mentioned example. Any information can be used as the identifier if it is information capable of identifying a UE to be triggered. And, a combination of two or more identifiers may identify the UE to be triggered. Moreover, identifiers different from each other can be used depending on a network node. For instance, the HSS/HLR, which stores the information indicating that there exist a trigger (or a short message including a trigger message) to be delivered to the UE, uses the IMSI and the MTC-IWF, which stores the device trigger request message, can use the external identifier.

As mentioned in the foregoing description, the method of performing a retry after storing the transmission-failed device trigger request in the MTC-IWF (or a third storing node managed by the MTC-IWF) and the method of performing a retry in a manner of delivering the device trigger request message to the MTC-IWF after recognizing availability of the trigger delivery to the UE although the transmission-failed device trigger request is stored in a different node are advantageous in that the MTC-IWF can utilize various interfaces such as T5a, T5b, T5c and T4 to perform retransmission. Compared to the SMS-SC, when MTC UEs belonging to an identical MTC group should be simultaneously triggered, the SMS-SC transmits an SMS including the device trigger message to each of the MTC UEs. On the contrary, the MTC-IWF uses a trigger mechanism such as a cell broadcast form in case of performing retransmission. By doing so, the MTC-IWF can efficiently transmit the trigger message to the MTC UEs.

In the following description, exemplary trigger procedures according to embodiment of the present invention are explained with reference to FIG. 6 to FIG. 7 based on the aforementioned descriptions. Specifically, FIG. 6 explains that information on a retry indicates to perform the retry. In particular, FIG. 6 explains that the retry is delegated to a serving node. FIG. 7 explains that the information on the retry indicates not to perform the retry. In the following example, contents, which are not specifically described, can be substituted by the aforementioned descriptions. The present invention may be non-limited by the following exemplary trigger procedures. It is apparent to those skilled in the art that a different example derivable from the following examples and the aforementioned descriptions belongs to the scope of the present invention.

Trigger Procedure Embodiment 1

Figure 6:
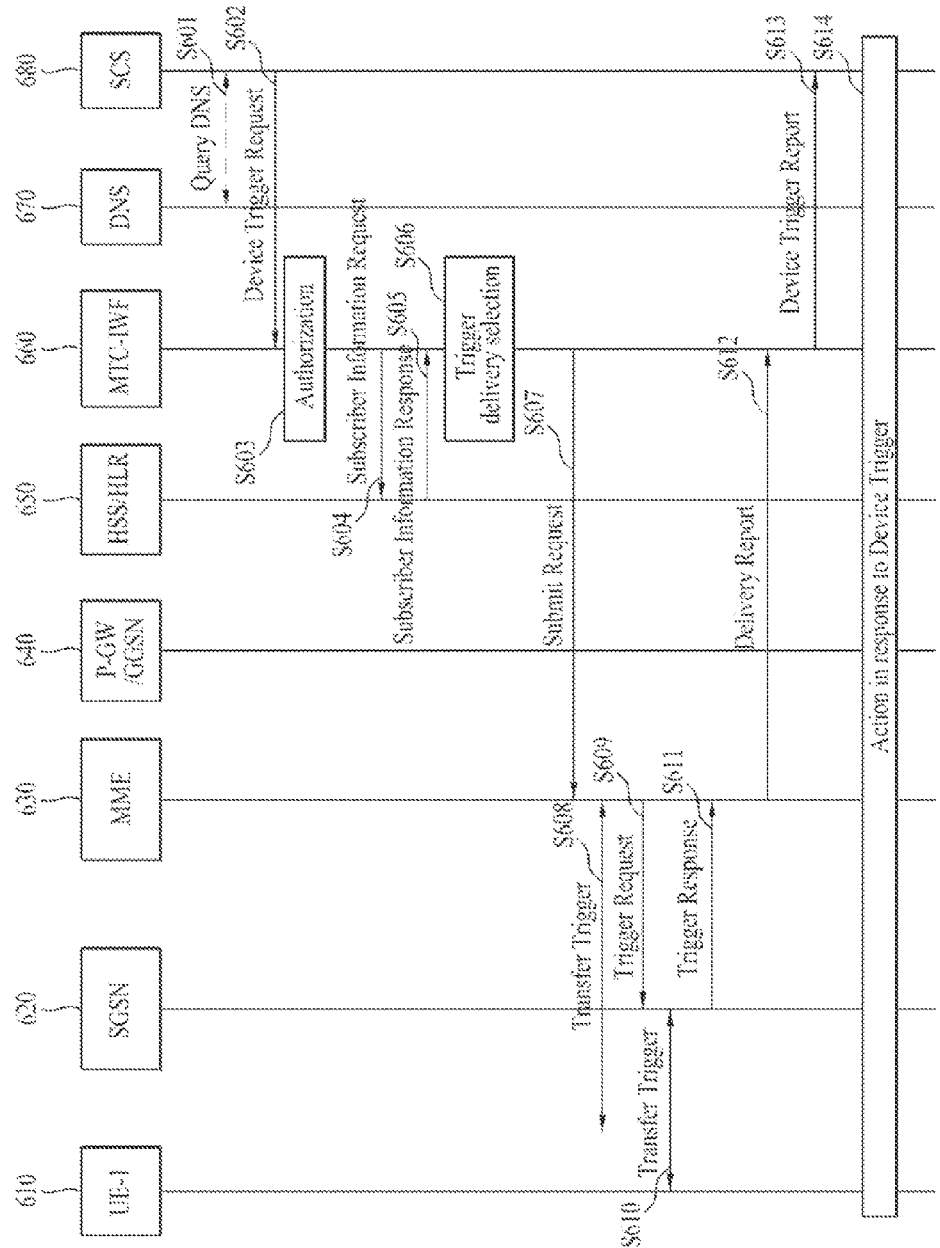
FIG. 6 to FIG. 7 is a diagram for explaining a trigger delivery procedure according to embodiment of the present invention.
Figure 7:
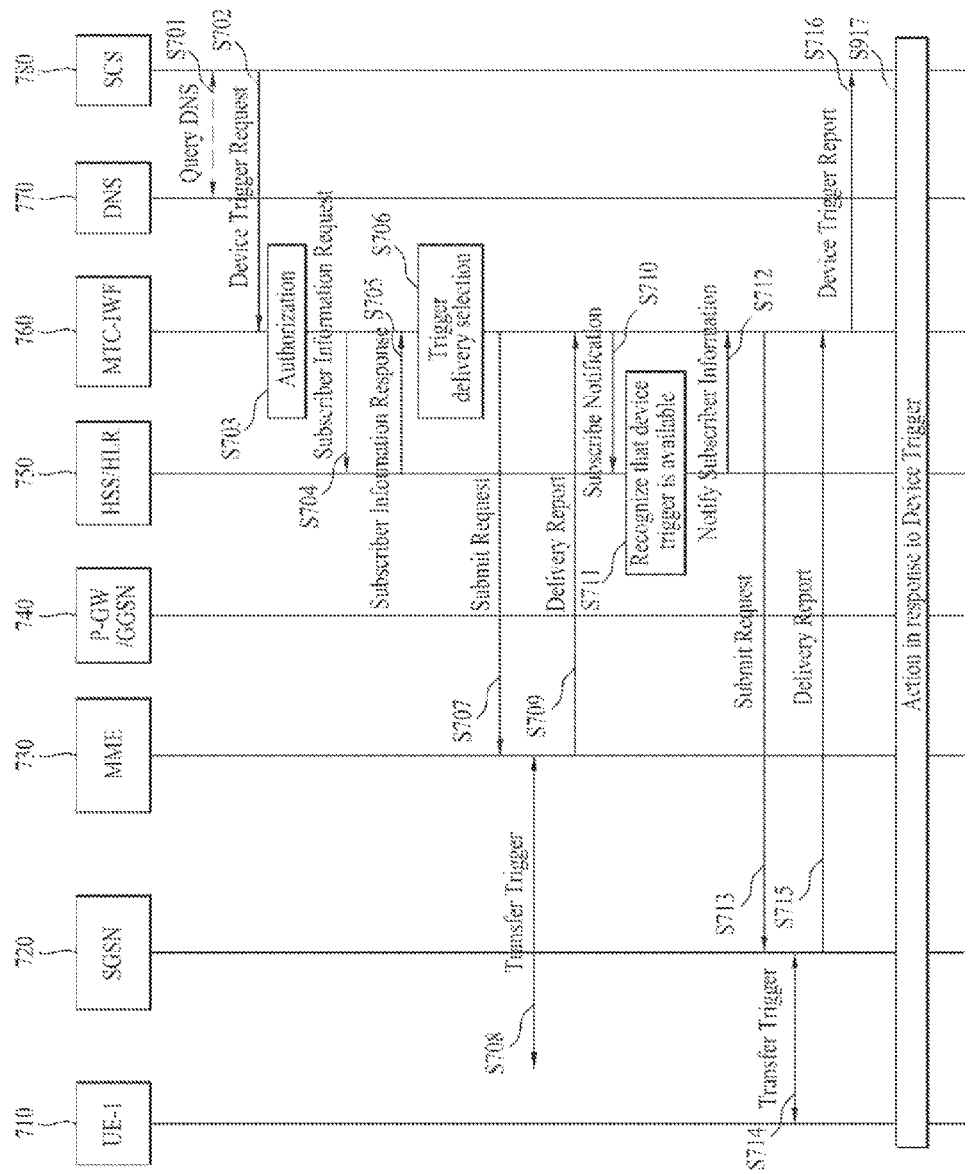

Referring to FIG. 6, the SCS 680 can determine to trigger the MTC UE in the step S601. If there is no information on the MTC-IWF contacted by the SCS to make a request for triggering, an IP address or a port number of the MTC-IWF can be determined by performing a DNS query to a DNS 670 using an external identifier of the MTC UE to be triggered or an identifier of the MTC-IWF configured within the SCS. Subsequently, the SCS 680 transmits a device trigger request message to the MTC-IWF 660 in the step S602. The device trigger request message can include information listed in a following Table 6.

TABLE 6 i) external identifier or MSISDN: an identifier of an MTC UE (or a subscriber to which the MTC UE belongs) to be triggered
ii) SCS identifier: an identifier of the SCS transmitting the device trigger request message
iii) trigger reference number: a reference number of the transmitted device trigger request message
iv) validity period: a time period for which the device trigger request is valid. If a device trigger is not delivered to the MTC UE, a network entity (e.g., MTC-IWF) informs a period of storing the device trigger request. If a value of the validity period information corresponds to 0 or does not exist, the network entity (e.g., MTC-IWF) may not perform UE trigger retry.
v) priority: priority of delivering the device trigger request
vi) trigger payload: information delivered to MTC application within the MTC UE
vii) retransmission request information: information making the network entity (e.g., MTC-IWF) perform the UE trigger retry. Instead of this information, the validity period information may explicitly or implicitly indicate the network entity (e.g., MTC-IWF) to request retransmission.

Having received the device trigger request message from the SCS 680, the MTC-IWF 660 performs authorization verification for whether a trigger request transmitted to a 3GPP network by the SCS is permitted in the step S603. If the authorization verification fails, the MTC-IWF 660 transmits a device trigger confirmation message indicating that the device trigger request has failed to the SCS 680. If the authorization verification is successful, a next step S604 can be performed.

The MTC-IWF 660 transmits a subscriber information request message to the HSS/HLR 650 in the step S604. The subscriber information request message is transmitted to check whether the SCS is permitted to trigger the MTC UE, to obtain IMSI using the received identifier of the MTC UE, and to obtain routing information including an identifier of a serving node that serves the MTC UE.

The HSS/HLR 650 checks whether the SCS, which has transmitted the device trigger request message, corresponds to the SCS permitted to trigger the MTC UE in the step S605. Subsequently, the HSS/HLR 650 transmits a subscriber information response message to the MTC-IWF 660. The subscriber information response message includes an identifier of the IMSI and an identifier of the serving node that serves the MTC UE. As a result of the checking, if the SCS is not permitted to trigger the MTC UE or if there is no valid subscription information related to the MTC UE in the HSS/HLR 650, the HSS/HLR 650 transmits the subscriber information response message including information on the aforementioned content to the MTC-IWF 660. In this case, the MTC-IWF 660 transmits a device trigger confirmation message indicating that the device trigger request has failed to the SCS 680 and does not perform following steps.

The MTC-IWF 660 selects a trigger response procedure based on the information received from the HSS/HLR 650 and a local policy in the step S606. In the following, assume that an available serving node corresponds to the SGSN and the MME. Assume that the MTC-IWF 660 selects a device trigger delivery to the MME using a T5b interface as a trigger delivery procedure. The MTC-IWF 660 transmits a submit request message to the MME 630 in the step S607. In this case, the MTC-IWF 660 can include the informations required for the device trigger, which are received from the SCS 680 in the step S602, in the submit request message as it is or a processed form of the informations. The MTC-IWF 660 can include information, which indicates that a retry will be performed by the SGSN by transmitting the device trigger request to the SGSN if the MME fails to perform a device trigger operation, in the submit request message. In addition, information on the number of retry may be included in the submit request message. Moreover, information on retry permit time may be included in the submit request message.

Having received the submit request message, the MME 630 intends to deliver a trigger message to a UE-1 610 which is a target UE of the device trigger in the step S608. Yet, if the UE-1 is not reachable, if the MME is overload, if E-UTRAN is congested or the like, the trigger message delivery may fail. If the delivery fails, it may go to a next step S609.

In the step S609, the MME 630 performs a retry by transmitting the trigger request message to the SGSN 620 based on the information on the retry received from the MTC-IWF 660. The trigger request message can include the informations required for the device trigger, which are received from the MTC-IWF 660, as it is or a processed form of the informations. And, information (e.g., reason of failure of the delivery, information on the MTC-IWF and the like) required by the MME 360 itself can be included in the trigger request message.

Having received the trigger request message, the SGSN 620 delivers a trigger message to the UE-1 610 which is the target UE of the device trigger in the step S610. Having received the trigger message, the UE-1 610 responds to the SGSN 620. Having performed a trigger operation, the SGSN 620 transmits a trigger response message to the MME 620 in the step S611. The trigger response message includes a result (whether the trigger delivery to the MTC UE is successful or not) of the device trigger requested by the MME. Having received the trigger response message, the MME 630 transmits a delivery report message to the MTC-IWF 660 in the step S612. The delivery report message includes a result (whether the trigger delivery to the MTC UE is successful or not) of the device trigger requested by the MTC-IWF. The MTC-IWF 660 transmits a device trigger report message to the SCS 680 in response to the device trigger request message in the step S613. The device trigger report message includes a result (whether the trigger delivery to the MTC UE is successful or not) of the device trigger requested by the SCS. The UE-1 610 performs an operation based on the content of the trigger payload in response to the received device trigger. This sort of operation typically includes initiation of a communication with the SCS or an AS.

According to the aforementioned step S611, the SGSN 620 gives a response to the MME 630 after performing the operation of the device trigger message delivery and the MME 630, which has received the response, responds to the MTC-IWF 660 in the step S612. On the contrary, the SGSN 620 may transmit a message (e.g., delivery report message) including a delivery result to the MTC-IWF 660 after performing the operation of the device trigger message delivery. In this case, after receiving the trigger request message from the MME 630 in the step S609, the SGSN 620 may directly transmit a response message indicating that the SGSN has well received the trigger request message to the MME 630.

Trigger Procedure Embodiment 2

In the following description, in case that information on a retry indicates not to perform the retry, a trigger procedure is explained with reference to FIG. 7. The MTC-IWF directly performs a retransmission operation.

The SCS 780 can determine to trigger the MTC UE in the step S701. If there is no information on the MTC-IWF contacted by the SCS to make a request for triggering, an IP address or a port number of the MTC-IWF can be determined by performing a DNS query to a DNS 770 using an external identifier of the MTC UE to be triggered or an identifier of the MTC-IWF configured within the SCS. Subsequently, the SCS 780 transmits a device trigger request message to the MTC-IWF 760 in the step S702. The device trigger request message can include information listed in the aforementioned Table 6.

Having received the device trigger request message from the SCS 780, the MTC-IWF 760 performs authorization verification for whether a trigger request transmitted to a 3GPP network by the SCS is permitted in the step S703. If the authorization verification fails, the MTC-IWF 760 transmits a device trigger confirmation message indicating that the device trigger request has failed to the SCS 780. On the contrary, if the authorization verification is successful, a next step S704 can be performed.

The MTC-IWF 760 transmits a subscriber information request message to the HSS/HLR 750 in the step S704. The subscriber information request message is transmitted to check whether the SCS is permitted to trigger the MTC UE, to obtain IMSI using the received identifier of the MTC UE, and to obtain routing information including an identifier of a serving node that serves the MTC UE. The HSS/HLR 750 checks whether the SCS, which has transmitted the device trigger request message, corresponds to the SCS permitted to trigger the MTC UE in the step S705. Subsequently, the HSS/HLR 750 transmits a subscriber information response message to the MTC-IWF 760. The subscriber information response message includes an identifier of the IMSI and an identifier of the serving node that serves the MTC UE. As a result of the checking, if the SCS is not permitted to trigger the MTC UE or if there is no valid subscription information related to the MTC UE in the HSS/HLR 750, the HSS/HLR 750 transmits the subscriber information response message including information on the aforementioned content to the MTC-IWF 760. In this case, the MTC-IWF 760 transmits a device trigger confirmation message indicating that the device trigger request has failed to the SCS 780 and does not perform following steps.

The MTC-IWF 760 selects a trigger delivery procedure based on the information received from the HSS/HLR 750 and a local policy in the step S706. In the following, assume that an available serving node corresponds to the MME. Assume that the MTC-IWF 760 selects a device trigger delivery to the MME using a T5b interface as a trigger delivery procedure.

The MTC-IWF 760 transmits a submit request message to the MME 730 in the step S707. In this case, the MTC-IWF 760 can include the informations required for the device trigger, which are received from the SCS 780 in the step S702, in the submit request message as it is or a processed form of the informations. The MTC-IWF 760 can include information, which indicates that a retry will not be performed by the MME if the MME fails to perform a device trigger operation, in the submit request message.

Having received the submit request message, the MME 730 intends to deliver a trigger message to a UE-1 710 which is a target UE of the device trigger in the step S708. Yet, if the UE-1 is not reachable, if the MME is overload, if E-UTRAN is congested or the like, the trigger message delivery may fail. Having performed a trigger operation, the MME 730 transmits a delivery report message to the MTC-IWF 760 in the step S709. The delivery report message includes a result (whether the trigger delivery to the MTC UE is successful or not) of the device trigger requested by the MTC-IWF.

Having received the delivery report message, which indicates that the trigger delivery to the MTC UE in the step S709 has failed, the MTC-IWF 760 transmits a subscribe notification message to the HSS/HLR 750 and subscribes a UE-related information notification service provided by the HSS/HLR 750 in the step S710. In order to identify the MTC UE (or a subscriber to which the MTC UE belongs), at least one of the external identifier, the MSISDN, and the IMSI can be used. In FIG. 7, assume that the MTC-IWF 760 determines not to perform a retry to the SMS-SC using the T4 interface. As mentioned in the foregoing description, as a reference for determining not to perform the retry to the SMS-SC using the T4 interface, at least one of the informations listed in Table 7 in the following, by which the present invention may be non-limited. Various informations can be used as the reference. The following informations may be configured in the MTC-IWF or can be obtained from a different node such as the HSS/HLR, the MME, the SGSN, the MSC, and the SMS-SC. And, the MTC-IWF may determine to perform the step 710 (i.e., store and forward operation) instead of performing the retry using the T4 interface immediately after the failure of the trigger transmission using the T5 interface.

TABLE 7 i) T4 interface does not exist.
ii) the number and/or a type of available serving node
iii) capability of available serving node (e.g., whether T5 is supported, whether SMS is supported, etc.)
iv) capability of UE (e.g., whether T5 is supported)
v) congestion of network (congestion of core network, congestion of radio network, congestion of T5 interface, congestion of T4 interface and the like)
vi) congestion of MTC-IWF
vii) priority of trigger request
viii) reason for failure of trigger delivery to T5
ix) history related to T4, T5 trigger delivery (failure rate and the like)
x) whether UE is available and/or whether it is reachable to UE The HSS/HLR 750 knows that the trigger delivery to the MTC UE, which corresponds to the notification service requested by the MTC-IWF 760 in the step S710, becomes available in the step S711. The HSS/HLR 750 can obtain information indicating that the trigger delivery to the MTC UE has become available from a serving node or a different node. The HSS/HLR 750 transmits a notify subscriber information message to the MTC-IWF 760 to inform the MTC-IWF of the availability of the trigger delivery to the MTC UE in the step S712. The notify subscriber information message can additionally include various informations (e.g., identifier of the serving node serving the MTC UE and the like) required by the MTC-IWF 760 to perform the device trigger operation. The MTC-IWF 760 selects a trigger delivery procedure based on information received from the HSS/HLR 750 and a local policy. In the following, assume that the SGSN corresponds to an available serving node. Hence, the MTC-IWF 760 selects a device trigger delivery to the SGSN using the T5a interface as the trigger delivery procedure. Yet, on the contrary, the MTC-IWF 760 may select a device trigger delivery to the SMS-SC using the T4 interface. Or, if the available serving node corresponds to the MME and the SGSN, the MTC-IWF 760 may select a device trigger delivery to the MME using the T5b interface as the trigger delivery procedure.

The MTC-IWF 760 transmits a submit request message to the SGSN 720 in the step S713. In this case, the MTC-IWF 760 can include the informations required for the device trigger, which are received from the SCS 780 in the step S702, in the submit request message as it is or a processed form of the informations. The MTC-IWF 760 can include information, which indicates that a retry will not be performed by the SGSN if the SGSN fails to perform a device trigger operation, in the submit request message.

Having received the submit request message, the SGSN 720 delivers a trigger message to a UE-1 710 which is a target UE in the step S714. Having received the trigger message, the UE-1 710 responds to the SGSN 720. Having performed the trigger operation, the SGSN 720 transmits a delivery report message to the MTC-IWF 760 in the step S715. The delivery report message includes a result (whether the trigger delivery to the MTC UE is successful or not) of the device trigger requested by the MTC-IWF. The MTC-IWF 760 transmits a device trigger report message to the SCS 780 in response to the device trigger request message in the step S702 in the step S716. The device trigger report message includes a result (whether a trigger delivery to the MTC UE is successful) of the device trigger requested by the SCS. As a response to the received device trigger, the UE-1 710 performs an operation based on content of a trigger payload. This sort of operation typically includes initiation of a communication with the SCS or an AS.

In the aforementioned step S705, if the information received from the HSS/HLR 750 includes a plurality of available serving nodes (e.g., the MME and the SGSN), the MTC-IWF 760 receives a response message indicating that the device trigger delivery has failed from the MME and may be then able to retry the device trigger operation by transmitting a submit request to the SGSN instead of performing the step S710. Yet, on the contrary, although the information received from the HSS/HLR 750 in the step S705 includes a plurality of the available serving nodes, the MTC-IWF 760 receives the response message indicating that the device trigger delivery has failed from the MME in the step S709 and may be then able to perform the step S710. This sort of decision may be based on various information such as a local policy, priority information of a trigger request, congestion of a network, congestion of the MTC-IWF, congestion of the T5a interface, congestion of the T5b interface, congestion of the T5b interface, subscriber information, roaming status of the MTC UE, configuration within the MTC-IWF, whether a UE is available, whether it is reachable to a UE, and the like.

Although a retry to the SMS-SC using the T4 interface is not performed in the step S710, the MTC-IWF 760 receives a delivery report message indicating that the trigger delivery to the MTC UE has failed in the step S709 and may be then able to perform a retry to the SMS-SC using the T4 interface. If the above-mentioned retry fails, the MTC-IWF may perform the step S710. In this case, when the MTC-IWF performs the retry to the SMS-SC, it is able to include information, which indicates not to perform the retry, in the retry-related information in order not to delegate retransmission to the SMS-SC.

The aforementioned items explained in various embodiments of the present invention can be implemented in a manner of being independently applied or in a manner that two or more embodiments are simultaneously applied.

Figure 8:
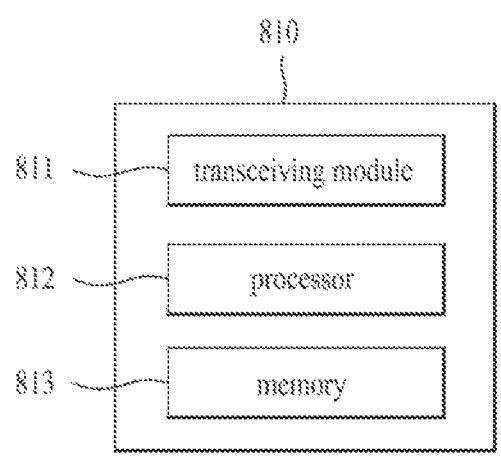
FIG. 8 is a diagram for a device configuration according to embodiment of the present invention.

FIG. 8 is a diagram for a configuration of a user equipment device and a network node device according to one embodiment of the present invention.

Referring to FIG. 8, an MTC-IWF device 810 according to the present invention can include a transceiving module 811, a processor 812 and a memory 813. The transceiving module can be configured to transmit various signals, data, and information to an external device (the network node 820 and/or a server device (not depicted)) and can be configured to receive various signals, data, and information from the external device (the network node 820 and/or a server device (not depicted)). The processor 812 can control overall operations of the MTC-IWF 810 and can be configured to perform a function of calculating information, which is to be transceived with the external device, and the like. The memory 813 can store the calculated information and the like for a prescribed time and can be replaced with such a configuration element as a buffer (not depicted).

The processor of the MTC-IWF 810 according to one embodiment of the present invention transmits the trigger request and information on a retry of the trigger request to a first serving node. The information on the retry of the trigger request includes information on whether to perform the retry when transmission of the trigger request fails. If the information on whether to perform the retry indicates to perform the retry, the trigger request retry can be delegated to the first serving node.

Detail configuration of the aforementioned MTC-IWF 810 can be implemented in a manner that the aforementioned items explained in various embodiments of the present invention are independently applied or two or more embodiments are simultaneously applied. For clarity, explanation on the duplicated contents is omitted.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned embodiments of the present invention can be applied to various mobile communication systems.

What is claimed is:

1. A method of performing a MTC (machine type communication) trigger request, which is performed by a MTC-IWF (interworking function) in a wireless communication system, comprising:
   transmitting the trigger request and first information about a retry of the trigger request to a first serving node,
   wherein the first information comprises information on whether to perform the retry when a delivery of the trigger request by the first serving node fails, and
   wherein, if the first information indicates to perform the retry, the first information configures the first serving node to retry the delivery of the trigger request based on the first information when the delivery of the trigger request fails,
   wherein, if the first information indicates not to perform the retry, the first information configures the first serving node to transmit a delivery report message indicating a failure of delivering the trigger request by the first node to the MTC-IWF without retrying the delivery of the trigger request, and
   wherein the first information further comprises at least one of a number of the retry and validity time of the retry for the first serving node.

2. The method of claim 1, wherein the first information is determined in consideration of at least one selected from the group consisting of the number of available serving node, a congestion status of a network, preference of an MTC user equipment and whether roaming of the MTC user equipment is performed.

3. The method of claim 1, wherein the first serving node corresponds to one of an SGSN (serving GPRS (general packet radio service) supporting node), an MME (mobility management entity), or an MSC (mobile switching center).

4. The method of claim 1, further comprising:
   transmitting a subscriber notification message, which is transmitted to a HSS (home subscriber server)/a HLR (home location register) by the MCT-IWF to subscribe a user equipment-related information notification service; and
   receiving a notification subscriber information message indicating that trigger delivery to the user equipment becomes available from the HS S/HLR,
   wherein the notification subscriber information message comprises information on at least one serving node capable of transmitting a trigger to the user equipment.

5. The method of claim 4, further comprising the step of determining a second serving node among the at least one serving node using the notification subscriber information message and transmitting trigger request and second information on a retry of the trigger request to the second serving node.

6. The method of claim 4, wherein the information on the at least one serving node comprises an identifier of the at least one serving node.

7. The method of claim 1, further comprising:
   receiving the trigger request from an SCS (service capability server); and
   verifying whether the trigger request is valid.

8. An MTC-IWF (interworking function) device performing an MTC (machine type communication) trigger request in a wireless communication system, the MTC-IWF device comprising:
   a transceiver; and
   a processor,
   the processor configured to transmit the trigger request and first information about a retry of the trigger request to a first serving node,
   wherein the first information on the retry of the trigger request comprises information on whether to perform the retry when a delivery of the trigger request by the first serving node fails,
   wherein, if the first information indicates to perform the retry, the first information configures the first serving node to retry the delivery of the trigger request based on the first information when the delivery of the trigger request fails,
   wherein, if the first information indicates not to perform the retry, the first information configures the first serving node to transmit a delivery report message indicating a failure of delivering the trigger request by the first node to the MTC-IWF without retrying the delivery of the trigger request, and
   wherein the first information further comprises at least one of a number of the retry and validity time of the retry for the first serving node.

* * * * *